(12) United States Patent
Batcher et al.

(10) Patent No.: US 7,472,027 B1
(45) Date of Patent: *Dec. 30, 2008

(54) METHOD AND APPARATUS OF LOW POWER ENERGY DETECTION FOR A WLAN

(75) Inventors: Kenneth W. Batcher, Hudson, OH (US); Peter W. Ecclesine, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

This patent is subject to a terminal disclaimer.

(21) Appl. No.: 10/854,448

(22) Filed: May 26, 2004

Related U.S. Application Data

(63) Continuation of application No. 10/118,895, filed on Apr. 9, 2002, now Pat. No. 6,760,671.

(51) Int. Cl.
*G01R 21/00* (2006.01)
*H04B 17/00* (2006.01)
*H04J 13/00* (2006.01)

(52) U.S. Cl. .................. 702/60; 370/338; 370/342; 375/346; 455/63.1; 455/126; 455/266; 455/423

(58) Field of Classification Search .......... 702/60–63, 702/66, 79, 57; 340/286.02, 870.1; 370/332, 370/342, 350, 338; 375/202, 346; 455/126, 455/266, 423, 63
See application file for complete search history.

(56) References Cited

U.S. PATENT DOCUMENTS

| | | | |
|---|---|---|---|
| 5,781,543 A * | 7/1998 | Ault et al. .................. 370/342 |
| 5,809,059 A * | 9/1998 | Souissi et al. .............. 375/133 |
| 5,956,638 A * | 9/1999 | Chang et al. ............... 455/423 |
| 6,006,071 A * | 12/1999 | Roberts et al. ............. 455/63.1 |
| 6,047,171 A * | 4/2000 | Khayrallah et al. ......... 455/266 |
| 6,169,475 B1 * | 1/2001 | Browning ............... 340/286.02 |
| 6,532,357 B1 * | 3/2003 | Ichikawa ................... 455/126 |
| 2002/0021685 A1 * | 2/2002 | Sakusabe ................... 370/338 |
| 2002/0060995 A1 * | 5/2002 | Cervello et al. ............ 370/332 |
| 2002/0196876 A1 * | 12/2002 | Takada ...................... 375/346 |
| 2003/0007473 A1 * | 1/2003 | Strong et al. ............... 370/338 |
| 2003/0123420 A1 * | 7/2003 | Sherlock .................... 370/338 |

* cited by examiner

*Primary Examiner*—John H Le
(74) *Attorney, Agent, or Firm*—Tucker Ellis & West LLP

(57) ABSTRACT

A method and implementation disclosed for detecting interference. A state machine controller is provided for establishing an interference detection cycle including a power sample period and a periodic sampling interval. A receiver component, responsive to the state machine controller, performs an energy measurement at a predetermined wireless band during the power sample period. A threshold comparator determines whether the energy measurement exceeds a predetermined threshold. A processing implementation processes the energy measurement to determine whether it corresponds to interference on the predetermined wireless band, if the measurement exceeds the predetermined threshold. A deactivating implementation is used to instruct the state machine controller to await the next power sample period, if the energy measurement does not exceed the predetermined threshold.

36 Claims, 4 Drawing Sheets

BOTH COUNTERS FOR WAIT AND SAMPLE EXPAND EXPONENTIALLY, THEN RESET BACK TO SMALL SIZE

WAIT COUNTER EXPANDS EXPONENTIALLY, BUT SAMPLE COUNTER IS CONSTANT, THIS SAVES MORE ENERGY

METHOD AND APPARATUS OF LOW POWER ENERGY DETECTION FOR A WLAN

This application is a continuation of U.S. application Ser. No. 10/118,895, filed Apr. 9, 2002, now U.S. Pat. No. 6,760,671.

BACKGROUND OF THE INVENTION

The present invention is directed to the field of wireless telecommunications, with particular applicability to the detection and avoidance of sources of interference that can disrupt service over a wireless network. Many types of interference can be encountered in the operation of a Wireless Local Area Network (WLAN), particularly WLANs that operate in the 2.4 GHz and 5 Ghz bands. This interference can be produced by other devices licensed by the FCC to operate in the 2.4 or 5 GHz band, such as Bluetooth components, military and aircraft radar systems, certain types of cordless telephones, home RF systems, and various old style radios, including those that "frequency hop" within the unlicensed bands. Such interference can result in packet drops between clients and access points and can thereby disrupt service in the WLAN.

The IEEE 802.11(h) standard requires network management for WLANs that compete over the 5 GHz band with interfering sources. The standard requires the network to detect licensed users of other frequencies. It is necessary that a WLAN take measures to insure that it doesn't interfere with other licensed sources operating on the band, i.e., aircraft radar, etc. For example, the APs can instruct their clients to change to a non-interfering channel, or steer away from interferers for clients equipped with directional antennas.

Various approaches have been employed in previous systems for detecting sources of interference. Within an AP's cell, one or more clients (or stations, STA) may be geographically distributed so as to have a reception range that extends beyond the cell, outside the reception range of the AP. The clients can thereby be used to detect and report to the AP sources of interference from outside the cell. The AP would then manage client connectivity so as to avoid the interfering sources. FIG. 4 shows a typical WLAN network with two APs each having four associated STAs. Real-time network management could be effected by keeping the clients continuously on-line, listening for interferers. However, this solution is not practical since most clients in a WLAN are mobile (e.g. notebook computers or personal digital assistants), and the client battery would be quickly drained since the high power energy detect circuits are left on all the time.

Another previous-type solution entails "active polling" of clients by the AP to locate sources of interference. Clients are permitted to shut down during periods of inactivity, when they are not communicating with the AP. This happens normally in WLAN where a STA with no packet activity will listen for and respond to beacon signals from the AP so they can remain associated to the network. In this regard, the client is periodically activated by an internal timer, in synch with the period of the beacon signal. The clients are each turned on to listen to beacon. Each client sends a response signal to the AP in reply to the beacon, after which they "go back to sleep" in order to conserve power. By such active polling, the clients maintain association with the network, since they are disassociated if they do not respond to the beacon within a specific interval. In this way, power is conserved since the clients are in a low-power "sleep" mode for most of the duty cycle which is beneficial especially since network traffic is quite bursty and most of the time STAs are not doing any packet activity.

In order to detect interferers, the beacon periodically includes a "power monitor" command which instructs the clients to monitor the band and report if any interfering energy is detected. The AP collects the data from the client stations and then determines if the energy is interference, meaning that it cannot be read as a packet encrypted in accordance with the 802.11 network. Such "active polling" schemes suffer from certain deficiencies. Though power is conserved as compared to continuous sampling, a large amount of power is still consumed. The beacon period is several milliseconds and so the clients must turn on and off several times per second. Also, power is consumed by sending a response signal with the beacon power monitor command. This also results in a lot of network traffic, placing additional service demands upon the entire network. Also the AP is heavily burdened with power calculations from all clients which may number into the 100s for a large network. This processing burden may result in significant overhead in the AP. Further, the AP power monitor commands are only issued on the order of once per second. It is possible to miss a lot of interfering energy between these power samples. Thus, energy and traffic demands remain high with active polling schemes and are not as effective with locating sources of interference, resulting in sub-optimal cost/benefit realization.

SUMMARY OF THE INVENTION

The difficulties and drawbacks of previous type systems are overcome by the present invention in which a method and implementation are disclosed for detecting interference. A state machine controller is provided for establishing an interference detection cycle including a power sample period and a periodic sampling interval. A receiver component, responsive to the state machine controller, performs an energy measurement at a predetermined wireless band during the power sample period. A threshold comparator determines whether the energy measurement exceeds a predetermined threshold. A processing implementation processes the energy measurement to determine whether it corresponds to interference on the predetermined wireless band, if the measurement exceeds the predetermined threshold. A deactivating implementation is used to instruct the state machine controller to await the next power sample period, if the energy measurement does not exceed the predetermined threshold.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 1:
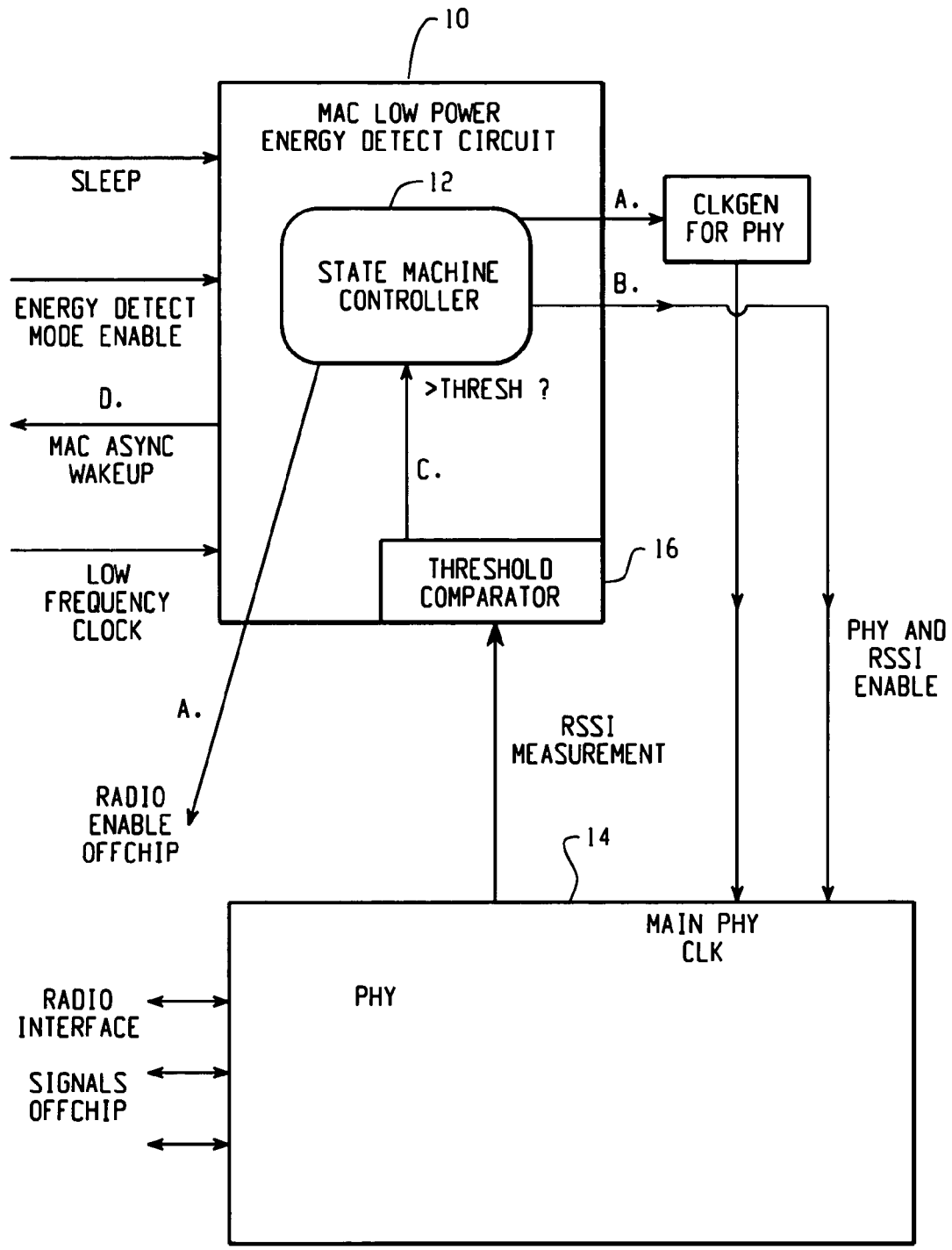
FIG. 1 is a schematic view showing the functionality in accordance with an exemplary embodiment of the present invention.

The energy detection circuit 10 of the present invention provides a client-based system of interference polling that reduces energy consumption and unnecessary network traffic. As shown in FIG. 1, the circuit 10 includes a state machine controller 12 for establishing an interference detection cycle. The state machine controller 12 is preferably an independent component operating at the level of the MAC (Medium Access Controller) and is used in conjunction with an on-chip PHY (physical layer processor) 14 that preferably uses analog radio components for detecting radio frequency (RF) energy at a desired wireless band. Of course, the circuit can be deployed in other implementations using different levels of silicon integration without departing from the invention.

The state machine controller 12 is driven by a low frequency clock, preferably operating at about 32 KHz to provide low power utilization. The state machine controller 12 is periodically activated after a desired number of clock cycles, in accordance with the established interference detection cycle. The state machine controller 12 is enabled while the MAC is "asleep" i.e. during down times when not executing code. Furthermore the "sleep" state disables all active clocks and analog components in the MAC and PHY in order to greatly reduce power. The present invention can be utilized as a more efficient way to measure energy in between beacon intervals, or when the client station is de-associated off the network (not responding to beacons). More details of the de-associated mode is described below.

As the circuit can be deployed on either a wireless client or AP, the state machine controller 12 can be enabled when these components are in a "power down" state and has no active network packets to process. In the de-associated mode for example, a "MicroSoft Windows 2000" environment, the system could be in a "standby" or "hibernate" mode if the station is off the network.

The interference detection cycle established by the state machine controller 12 includes a power sample period in which an energy detection measurement is performed. The power sample period is essentially an active state having a frequency defined by a periodic sampling interval including an inactive state between power sample periods. The power sample period and the periodic sampling interval are programmable, as will the set forth in detail below.

During a power sample period, the state machine controller 12 will first "ramp up" operation and enable radio circuitry and clock generation for the main clock of the PHY 14 (as indicated by A in FIG. 1). The state machine controller 12 then activates the PHY to perform an energy measurement (as indicated by B in FIG. 1). These components function as a receiver component for performing the energy measurement in terms of Received Strength Signal Indicators (RSSI) in order to detect interfering energy at the desired band. The RSSI measurement is received by a threshold comparator 16 which determines whether the energy measurement exceeds a predetermined threshold (as shown in C in FIG. 1). This threshold can be optionally set to detect any levels of interference. However, if set to detect low levels, the circuit will be actuated more frequently, thereby consuming more energy. If the measured RSSI level is greater than the threshold, the state machine controller 12 will send signal (indicated as D in FIG. 1) to actuate the MAC which in turns powers up all PHY circuits and restores the high speed clock. Thus the MAC/PHY software and hardware is enabled for processing the RSSI measurements to determine whether the detected energy corresponds to interference on the wireless band, or whether it corresponds to an actual valid packet reception to be properly received on the WLAN. Also, the processing implementation can actuate and forward the energy measurement to a processing component. For example, the PHY can be turned on for taking further actions, e.g., forwarding messages or data to other components of the WLAN, such as APs and servers, and taking the host processor (e.g., laptop computer or PDA) out of hibernate or standby mode. If no energy is detected during a particular power sample period, a deactivating implementation (e.g., software or hardware switch, etc.) is used to instruct the state machine controller 12 to await the next power sample period, and shuts down in between power sampling periods. The circuit 10 will repeat cyclically to scan for interference until energy is detected or until the MAC awakens to respond to a beacon or until some other host interaction from the laptop or PDA computer device.

In this way, the present circuit allows passive interaction with the network, and can remain associated to the AP without continual polling, thereby conserving energy and reducing network traffic. Optional an added power savings advantage is that a client station in a de-associated mode can still look for energy. Upon detection of energy above the threshold, the client will then inform the AP and re-associate back into the network providing the power data measurements.

The present circuit and method can be realized in many ways without departing from the invention. Preferably, the RSSI measurement is interpreted as raw data in an eight-bit, 10-22 MHz data stream. An appropriate A/D conversion, is performed prior to being received by the threshold comparator 16, which includes an eight-bit register with preloaded values. If the received energy is greater than the threshold value stored in the register, the processing implementation activates an analyzing implementation (which can be hardware or software). The analyzing implementation analyzes the waveform characteristics of the raw data to determine whether the waveform characteristics are compatible with desired signals, i.e. WLAN data packets in accordance with the IEEE 802.11 standards. The analyzing implementation can include a Fast Fourier Transform waveform analyzer. If the waveform characteristics are not compatible, the analyzing implementation determines the energy measurement corresponds to interference. Different signal characteristics can thereby be determined. For example, 802.11 data tends to arrive in evenly spaced waveforms that are easy to detect when synched up. Bluetooth signals tend to be highly pulsed and radar signals tend to be signal spikes over the long period of the sweep pattern. Thus, interference signals can be recognized by their waveforms.

The IEEE 802.11 (h) standard only requires that unidentifiable sources of repetitive energy be avoided. It can be sufficient for an AP to instruct clients to change channels if an interferer is active. In a WLAN that uses adaptive directional antennas, clients can steer away from sources of interference. For this purpose the processing implementation can include software or apparatus for determining the direction to a source of interference or other energy measurement. In this way, multiple clients using the present invention could pinpoint the location of potential interferers. In another aspect, several clients in the same geographical area can operate out of phase and thereby divide the time for power sample periods, allowing greater energy conservation. Also, multiple clients can be used simultaneously to "snoop" for different types of interference, e.g., one could be attuned to Bluetooth interference, another could listen for cordless phone signals on the band, etc. These determinations are made by selecting the lengths of the power sample period and periodic sampling interval, as disclosed presently below.

Figure 2:
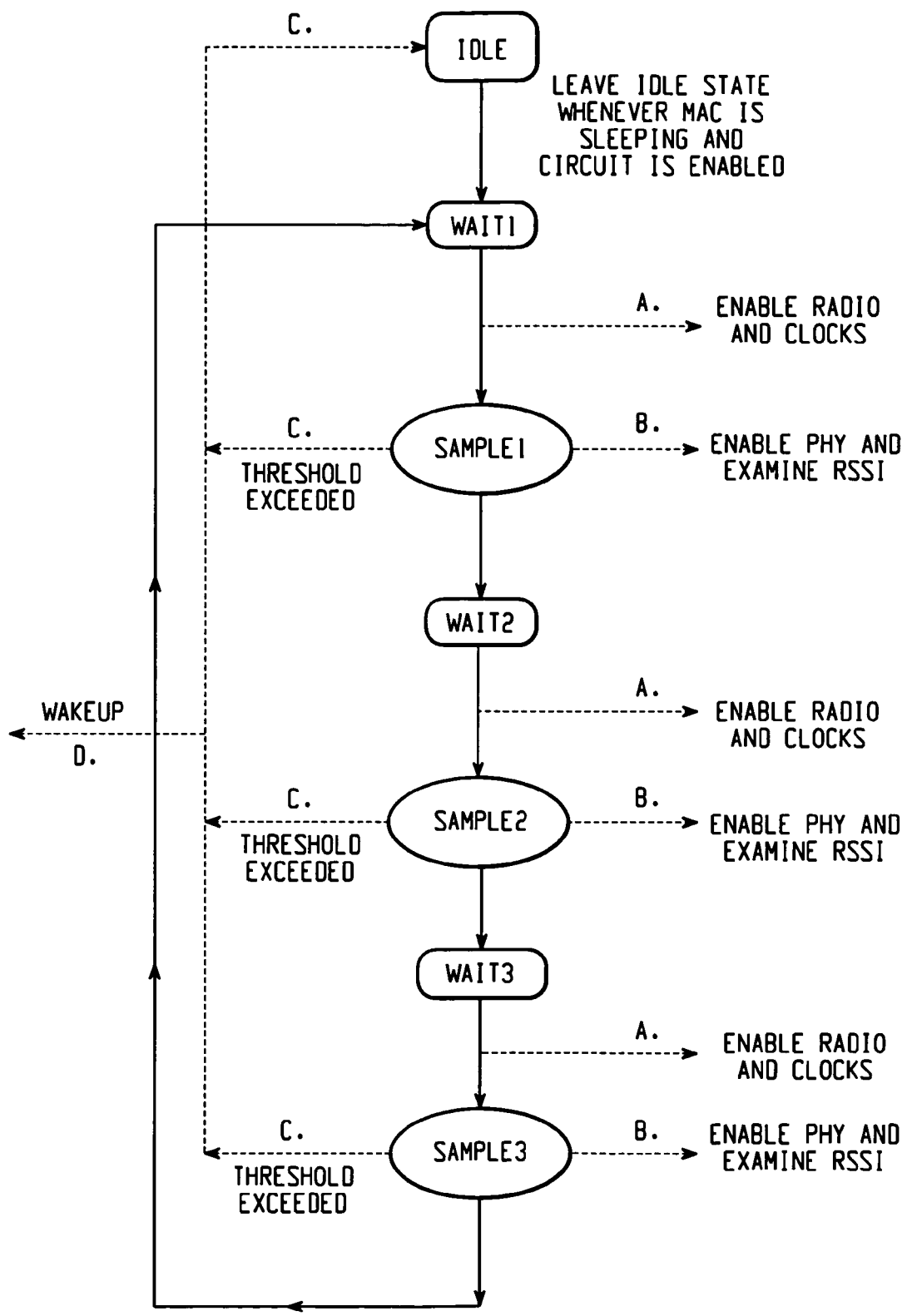
FIG. 2 is a flow chart depicting the state machine controller operational modes in accordance with an exemplary embodiment of the present invention.

The preferred operation of the state machine controller 12 is shown in FIG. 2 where three sample sets are performed in an interference detection cycle. The controller 12 is in an IDLE state when not in a power sample period (e.g. the MAC is active and not sleeping). When the circuit is enabled, the controller 12 changes to WAIT1 mode. After an appropriate interval, it enters the power sample mode where it (A.) enables the radio circuits and the higher speed clocks. The power sample is conducted during SAMPLE1 where (B.) the PHY is enabled and the RSSI measured. If threshold is exceeded (C.) a "wakeup" message (D.) is sent to the MAC to activate the MAC for further actions at full operating speed (packet processing, or waveform analysis etc.). The state controller 12 then returns to IDLE. If the threshold is not exceeded, the controller enters the second sample set in the WAIT2 state for the duration of the periodic sampling interval. At SAMPLE2, steps A.B.C. are performed again, and if the threshold is not exceeded, WAIT3 and SAMPLE3 states are performed, and the cycle is returned to WAIT1 if no interference is detected.

In the sample sets, the counters can be programmed so that the power sample period and the periodic sampling interval can be constant over time. For example, in each periodic sampling interval, the controller 12 could wait for eight clock cycles and the power sample period can be two clock cycles, and these periods can be repeated for all three sets and in any subsequent cycles. The periods can be selected to be "relatively prime" so as to detect an interference source having a known frequency. Periods that are relatively prime will "collide" or coincide with the period of the unknown interferer since they have a common multiple and both will eventually be on the air at the same time.

Figure 3A:
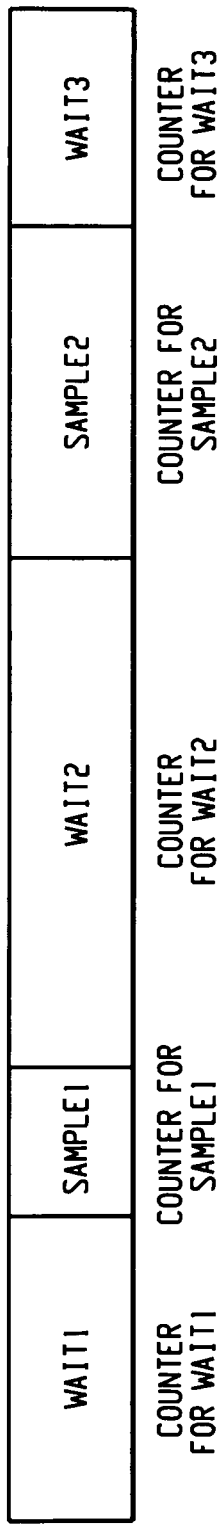
FIGS. 3A, 3B and 3C depict various operational modes of the state machine controller, in accordance with an exemplary embodiment of the present invention.
Figure 3B:
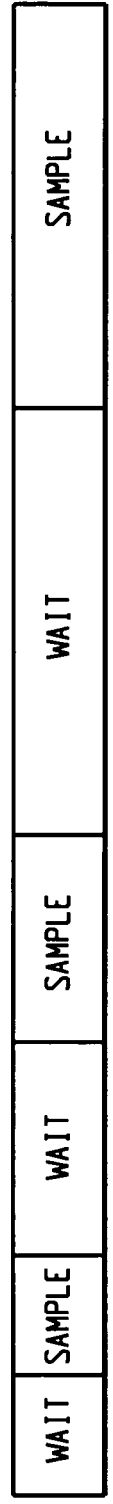
Figure 3C:
Figure 4:
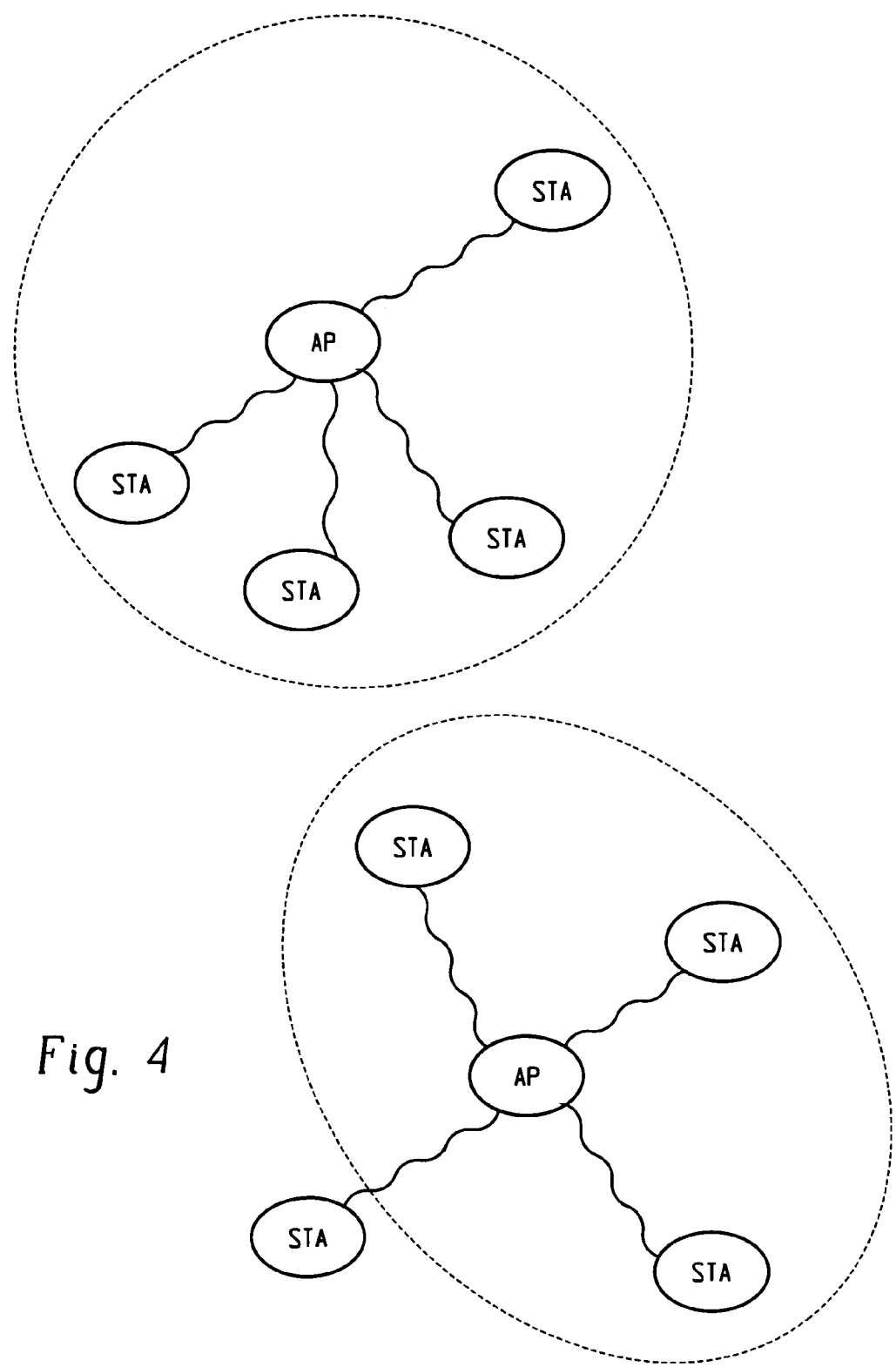
FIG. 4 is a exemplary depiction of a WLAN containing two APs each having four associated stations.

The counters can also be programmed to allow sample sets where the periodic sampling intervals and the power sample period sets are fixed and repeat cyclically over time. This is known as "Deterministic" mode. For example, as shown in FIG. 3A. As shown in FIG. 3B, the sample sets can also be programmed in an "Exponential" mode. WAIT1 and SAMPLE1 can each be four clock cycles. WAIT2 and SAMPLE2 can then each be eight clock cycles, and WAIT3 and SAMPLE3 can each be sixteen clock cycles, so that the sample and wait periods increase exponentially and eventually cycle back to a starting value. Also, as shown in FIG. 3B, an "Exponential Deterministic" mode can be programmed where SAMPLE1, SAMPLE2 and SAMPLE3 are all a fixed number of clock cycles and the WAIT intervals increase exponentially, the WAIT and SAMPLE intervals can also be driven by a random number generator. Also, any other technique for producing a sequence of intervals could be employed without departing from the invention.

The purpose of the different modes is due to the wide array of different energies that may exist in the WLAN space. Each may require a different sample period and wait interval in order to collide with interfering energy. These may include hard to detect energy in 5 GHz or 2.4 GHz band which includes aperiodic radar systems such as for military and weather uses. It should of course be understood that the invention can be adapted to detect energy at any wireless band as would occur to those skilled in the art.

An alternative use of circuit 10 of the present invention can be a component of either a wireless client or a wireless access point in a WLAN. This allows for a "wake on" WLAN operation where the AP can "sleep" until the client sends a signal. This permits considerable power savings since the AP usually runs continuously looking for clients. In this way the AP with no STA clients can go into the low power energy detect mode where it waits until a STA wanders into range. This is based on the simple premise: if there is no energy in range then there is no body to talk to, so why stay on? An embodiment is contemplated where the circuit 10 is a component of the wireless client, and the processing implementation forwards an interference determination to the wireless access point. This forwarding can be done in real time as interferers are identified. However, the processing implementation can log the interference determination in memory with several other interference determinations from other power sample periods, and the processing implementation sends these interference determinations to the AP in a batch, resulting in even less broadcast time. The circuit 10 can also on-board analysis and perform Fast Fourier transform and other signal processing. In this manner, a "smart" client can be deployed in any remote location to snoop on signals. The results can be forwarded in a burst to a distant AP or even a satellite. In this way, the present invention has potential surveillance applications. On the other hand, it is preferred to have a wireless client forward "raw" energy measurement data to an AP which includes a further processing implementation for processing the energy measurement, in order to determine at the AP whether the measurement corresponds to interference on the wireless band.

As disclosed, the present invention offers considerable power savings and network traffic by offering less "on" time. In a practical realization of the present circuit, it is considered that the "ramp-up" step indicated as A. would consume about 10 mW and the sample operation at B. would consume 70 mW since only the PHY energy detect circuits are enabled. This is compared with 1 watt to send a packet over the radio antenna or about 200-300 mW for continuous receiver monitoring with MAC/PHY fully enabled. The invention thereby eliminates the need for sending many useless packets each second. Keep in mind that the counters and sample periods are pre-programmed so that the STA can be completely off 95% to 99% of the time or more and consume <1 mW. This translates into significant battery life expansion and allows the STA to stay on for a couple days perhaps, compared to couple hours if continuous monitoring is used. The flexible nature of the sampling allows the invention to be robust in detection of the energy using but yet at the same time conserve battery life.

In addition to increasing client battery life and otherwise saving power, the present invention "wake on LAN feature" allows further progress toward Federal energy reduction standards in the AP or non portable STA which uses a non-battery supply (e.g. Energy Star Compliance).

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. An apparatus for detecting interference comprising:
   means for establishing an interference detection cycle, including a power sample period and a periodic sampling interval;
   means for performing an energy measurement at a predetermined wireless band during the power sample period;
   means for determining whether the energy measurement exceeds a predetermined threshold during the power sample period;
   means for processing the energy measurement to determine whether it corresponds to interference on the wireless band, if the energy measurement exceeds the predetermined threshold;
   means for awaiting the next power sample period, if the energy measurement does not exceed the predetermined threshold;

means for analyzing the waveform characteristics of the energy measurement to determine whether the waveform characteristics are compatible with desired signals; and means for determining that the energy measurement corresponds to interference if the waveform characteristics are not compatible.

2. The apparatus of claim 1 wherein the means for establishing an interference detection cycle is a circuit that shuts down between power sampling periods within the periodic sampling period.

3. The apparatus of claim 1 wherein the means for performing an energy measurement comprises means for measuring received signal strength at a 5 GHz wireless band.

4. The apparatus of claim 1 wherein the means for processing the energy measurement comprises a processing component and means for forwarding the energy measurement to the processing component.

5. The apparatus of claim 1 wherein the means for analyzing comprises means for performing a Fast Fourier Transform on the energy measurement.

6. The apparatus of claim 1 wherein the means for processing comprises means for determining the direction to the source of the energy measurement.

7. The apparatus of claim 1 wherein the power sample period and the periodic sampling interval are constant over time.

8. The apparatus of claim 7 wherein the power sample period and the periodic sampling interval are selected to be relatively prime so as to detect an interference source having a known frequency.

9. The apparatus of claim 1 wherein at least one of the power sample period and the periodic sampling interval are variable over time.

10. The apparatus of claim 9 wherein both the power sample period and the periodic sampling interval are selected so as to increase exponentially over time.

11. The apparatus of claim 9 wherein only the periodic sampling interval is selected so as to increase exponentially over time.

12. The apparatus of claim 1 wherein the apparatus for detecting interference is incorporated into at least one of a wireless client and a wireless access point in a wireless local area network.

13. The apparatus of claim 12 wherein the apparatus for detecting interference is incorporated into the wireless client and further comprises means for forwarding an interference determination to a wireless access point.

14. The apparatus of claim 13 wherein the means for forwarding forwards an interference determination to the wireless access point in real time.

15. The apparatus of claim 13 further comprising means for logging the determination with a plurality of determinations from respective other power sample periods, and further comprising means for sending these determinations to the wireless access points in a batch.

16. The apparatus of claim 12 wherein the means for establishing, performing and determining are incorporated into the wireless client, further comprising means for forwarding raw energy measurements to a wireless access point, wherein the means for processing is incorporated into the wireless access point.

17. A computer-readable medium of instructions comprising:

instructions for establishing an interference detection cycle, including a power sample period and a periodic sampling interval;

instructions for performing an energy measurement at a predetermined wireless band during the power sample period;

instructions for determining whether the energy measurement exceeds a predetermined threshold during the power sample period;

instructions for processing the energy measurement to determine whether it corresponds to interference on the wireless band, if the energy measurement exceeds the predetermined threshold;

instructions for awaiting the next power sample period, if the energy measurement does not exceed the predetermined threshold;

instructions for analyzing the waveform characteristics of the energy measurement to determine whether the waveform characteristics are compatible with desired signals; and instructions for determining that the energy measurement corresponds to interference if the waveform characteristics are not compatible.

18. The computer-readable medium of instructions of claim 17 wherein the instructions for establishing an interference detection cycle actuates a circuit that shuts down between power sampling periods within the periodic sampling period.

19. The computer-readable medium of instructions of claim 17 wherein the instructions for performing an energy measurement comprises instructions for measuring received signal strength at a 5 GHz wireless band.

20. The computer-readable medium of instructions of claim 17 wherein the instructions for processing the energy measurement comprises instructions for activating a processing component and instructions for forwarding the energy measurement to the processing component.

21. The computer-readable medium of instructions of claim 17 wherein the instructions for analyzing comprises means for performing a Fast Fourier Transform on the energy measurement.

22. The computer-readable medium of instructions of claim 17 wherein the instructions for processing comprises means for determining the direction to the source of the energy measurement.

23. The computer-readable medium of instructions of claim 17 wherein the power sample period and the periodic sampling interval are constant over time.

24. The computer-readable medium of instructions of claim 23 wherein the power sample period and the periodic sampling interval are selected to be relatively prime so as to detect an interference source having a known frequency.

25. The computer-readable medium of instructions of claim 17 wherein at least one of the power sample period and the periodic sampling interval are variable over time.

26. The computer-readable medium of instructions of claim 25 wherein both the power sample period and the periodic sampling interval are selected so as to increase exponentially over time.

27. The computer-readable medium of instructions of claim 25 wherein only the periodic sampling interval is selected so as to increase exponentially over time.

28. The computer-readable medium of instructions of claim 17 wherein the instructions for detecting interference is incorporated into at least one of a wireless client and a wireless access point in a wireless local area network.

29. The computer-readable medium of instructions of claim 28 wherein the instructions for detecting interference is incorporated into the wireless client and further comprises instructions for forwarding an interference determination to a wireless access point.

30. The computer-readable medium of instructions of claim 29 wherein the instructions for forwarding forwards an interference determination to the wireless access point in real time.

31. The computer-readable medium of instructions of claim 29 further comprising instructions for logging the determination with a plurality of determinations from respective other power sample periods, and further comprising instructions for sending these determinations to the wireless access points in a batch.

32. The computer-readable medium of instructions of claim 28 wherein the instructions for establishing, performing and determining are incorporated into the wireless client, further comprising instructions for forwarding raw energy measurements to a wireless access point, wherein the instructions for processing is incorporated into the wireless access point.

33. An apparatus for detecting interference comprising:
   means for establishing an interference detection cycle, including a power sample period and a periodic sampling interval;
   means for performing an energy measurement at a predetermined wireless band during the power sample period;
   means for determining whether the energy measurement exceeds a predetermined threshold during the power sample period;
   means for processing the energy measurement to determine whether it corresponds to interference on the wireless band, if the energy measurement exceeds the predetermined threshold; and
   means for awaiting the next power sample period, if the energy measurement does not exceed the predetermined threshold;
   wherein the power sample period and the periodic sampling interval are constant over time; and
   wherein the power sample period and the periodic sampling interval are selected to be relatively prime so as to detect an interference source having a known frequency.

34. An apparatus for detecting interference comprising:
   means for establishing an interference detection cycle, including a power sample period and a periodic sampling interval;
   means for performing an energy measurement at a predetermined wireless band during the power sample period;
   means for determining whether the energy measurement exceeds a predetermined threshold during the power sample period;
   means for processing the energy measurement to determine whether it corresponds to interference on the wireless band, if the energy measurement exceeds the predetermined threshold;
   means for awaiting the next power sample period, if the energy measurement does not exceed the predetermined threshold;
   wherein at least one of the power sample period and the periodic sampling interval are variable over time; and
   wherein only the periodic sampling interval is selected so as to increase exponentially over time.

35. The apparatus of claim 34, wherein both the power sample period and the periodic sampling interval are selected so as to increase exponentially over time.

36. An apparatus for detecting interference incorporated into a wireless client, comprising:
   means for establishing an interference detection cycle, including a power sample period and a periodic sampling interval;
   means for performing an energy measurement at a predetermined wireless band during the power sample period;
   means for determining whether the energy measurement exceeds a predetermined threshold during the power sample period;
   means for processing the energy measurement to determine whether it corresponds to interference on the wireless band, if the energy measurement exceeds the predetermined threshold;
   means for awaiting the next power sample period, if the energy measurement does not exceed the predetermined threshold;
   means for forwarding an interference determination to a wireless access point;
   means for logging the determination with a plurality of determinations from respective other power sample periods; and
   means for sending these determinations to the wireless access points in a batch.

* * * * *

UNITED STATES PATENT AND TRADEMARK OFFICE
CERTIFICATE OF CORRECTION

PATENT NO.        : 7,472,027 B1
APPLICATION NO.   : 10/854448
DATED             : December 30, 2008
INVENTOR(S)       : Kenneth W. Batcher and Peter W. Ecclesine It is certified that error appears in the above-identified patent and that said Letters Patent is hereby corrected as shown below:

Title page, item [63] "Related U.S. Application Data," replace with the following paragraph:

--Continuation of application No. ~~10/118,895~~ 10/118,985, filed on Apr. 9, 2002, now Pat. No. 6,760,671.--

Signed and Sealed this

Thirty-first Day of March, 2009

JOHN DOLL
*Acting Director of the United States Patent and Trademark Office*